(No Model.)
G. W. BROOKS.
SPIRAL RING.
No. 301,560. Patented July 8, 1884.
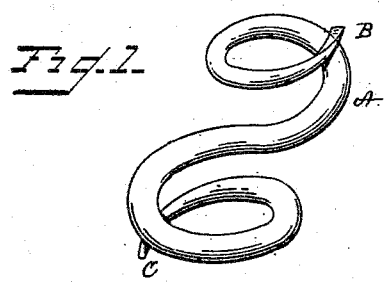
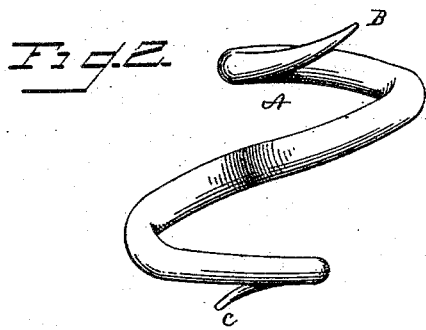
WITNESSES
F. L. Durand
W. S. Harris
Geo. W. Brooks
INVENTOR
by C. A. Brown
Attorneys

UNITED STATES PATENT OFFICE.

GEORGE W. BROOKS, OF COLEMAN, TEXAS.

SPIRAL RING.

SPECIFICATION forming part of Letters Patent No. 301,560, dated July 8, 1884.

Application filed April 28, 1884. (No model.)

*To all whom it may concern:*

Be it known that I, GEORGE W. BROOKS, a citizen of the United States, residing at Coleman, in the county of Coleman and State of Texas, have invented a new and useful Lap-Ring, of which the following is a specification, reference being had to the accompanying drawings.

This invention has relation to lap-rings designed for use between the tree-irons of double-trees and single-trees of wagons and plows; and it consists of the lap-ring constructed as will be hereinafter fully described and claimed.

Figure 1 of the drawings is a view in perspective of a lap-ring embodying my improvements. Fig. 2 is a side elevation.

Referring by letter to the accompanying drawings, A designates the lap-ring, which is made from a rod of iron forged first into a shape having the largest portion at the middle, and tapering from the middle in the direction of the ends to points at the ends. The rod is then formed into S form, the end curves B and C of the S being spread laterally in opposite directions from the stem of the S, and carried on in the line of spirals to distances of ninety degrees beyond a line that would divide the figure thus formed longitudinally. This construction leaves the ends of the lap-ring open, so that the eyes of the tree-irons may be readily connected to the lap-ring—one eye to each end of the ring. When once connected, the double-tree and single-trees cannot be accidentally disconnected when this improved lap-ring is used. There are no bolts, rivets, or welds to be broken, the lap-ring being made of a single piece of iron.

Having thus fully described my invention, what I claim as new, and desire to secure by Letters Patent of the United States, is—

The herein-described lap-ring for connecting the tree-irons of double-trees and single-trees, consisting of the S-shaped lap-ring having the end curves, B and C, spread laterally from the stem of the S, and carried round on spiral curves to points ninety degrees beyond a line that would evenly divide the figure thus formed longitudinally, substantially as specified.

In testimony that I claim the foregoing as my own I have hereto affixed my signature in presence of two witnesses.

GEORGE W. BROOKS.

Witnesses:
 WALTER SMITH,
 LOUIS E. WALKER.